United States Patent [19]

Kubbota et al.

[11] 4,407,896
[45] Oct. 4, 1983

[54] PROCESS FOR PREPARING A POLYOLEFIN RESIN-COATED PAPER FOR PHOTOGRAPHIC USE

[75] Inventors: Masashi Kubbota; Touru Noda, both of Tokyo, Japan

[73] Assignee: Mitsubishi Paper Mills, Ltd., Tokyo, Japan

[21] Appl. No.: 333,776

[22] Filed: Dec. 23, 1981

[30] Foreign Application Priority Data

Dec. 26, 1980 [JP] Japan ................................. 55-188374

[51] Int. Cl.³ .......................... B05D 3/02; G03C 1/85; G03C 1/86
[52] U.S. Cl. .................................... 428/513; 427/209; 427/391; 430/536; 430/538
[58] Field of Search .................. 427/391, 209, 211; 428/513; 430/536, 538

[56] References Cited

U.S. PATENT DOCUMENTS 3,501,298  3/1970  Crawford ........................... 430/536
4,145,480  3/1979  Kusama et al. .................. 428/417 X
4,188,220  2/1980  Kasugai et al. ................. 428/513 X

*Primary Examiner*—Michael R. Lusignan
*Attorney, Agent, or Firm*—Cushman, Darby & Cushman

[57] ABSTRACT

In preparing a polyolefin resin-coated paper for photographic use which comprises melt-extruding and coating a polyolefin resin composition containing titanium dioxide onto at least one surface of a paper sheet or a synthetic paper base, a composition having physical property value n (as defined in the specification) of not greater than 5 when measured at 200° C. and a shearing rate of 1000/sec is employed as the polyolefin resin composition. Thus, problems in preparation and quality due to generation of die lip stains can be solved.

14 Claims, 3 Drawing Figures

PROCESS FOR PREPARING A POLYOLEFIN RESIN-COATED PAPER FOR PHOTOGRAPHIC USE

BACKGROUND OF THE INVENTION

1. Field of the Invention

The present invention relates to a process for producing a polyolefin resin-coated paper which is used as a photographic support and more particularly to prevention of deterioration in surface quality due to contamination of a die lip which is caused upon preparation of a photographic support by melt-extruding a polyolefin resin composition containing titanium dioxide into a film state and coating such onto at least one surface of a paper sheet or a synthetic paper base.

2. Brief Description of the Prior Art

A polyolefin resin-coated paper for photographic use is already known and a photographic polyolefin resin-coated paper as disclosed in, e.g., U.S. Pat. No. 3,501,298 is obtained by coating both surfaces of a paper base with polyethylene resin, and the polyethylene layer on the emulsion-coated side contains titanium dioxide, blue pigments, fluorescent whitening agents, etc.

However, there is a tendency that needle-like or icicle-like attaches or stains (hereafter simply referred to as "die lip stains") generate at the top of a die lip by extrusion in a short period of time upon melt-extrusion of a polyolefin resin composition containing titanium dioxide, particularly a polyethylene resin composition containing titanium dioxide from a slit die in a film shape and, to be difficult to deal with, there is a tendency that these dye lip stains grow more and more with the passage of time for melt extrusion.

If the dye lip stains generate upon coating by melt-extrusion, streaks are formed on the surface of a photographic support in the longitudinal direction thereof, when the support is prepared in that state, or streakened unevenness in coating is formed due to an uneven coated amount, or stains are sometimes attached and coated onto a film to thereby produce foreign matters. For these reasons, surface quality of a polyolefin resin-coated paper thus prepared is seriously damaged and quite inadequate and of no commercial value for use of a photographic support which requires excellent surface quality.

Further, for completely removing die lip stains once formed, there is nothing but discontinuing the production line and cleaning a die lip; hard labors and time are required for the cleaning and such results in serious reduction in reproducibility. Thus immediate solution of such a problem has been desired.

SUMMARY OF THE INVENTION

An object of the present invention is to provide a process for producing a polyolefin resin-coated paper for photographic use capable of preventing deterioration in surface quality due to die lip stains which generate upon preparing a polyolefin resin-coated paper for photographic use.

The above object of the present invention has been accomplished by selecting as a polyolefin resin composition a composition having a physical property value n defined hereinafter of not greater than 5 at 200° C. and a shearing rate of 1000/sec.

DETAILED DESCRIPTION OF THE INVENTION

As a result of extensive investigations on causes for generating the die lip stains, the present inventors have found that the die lip stains are extremely seriously affected by melt viscosity of a polyolefin resin composition which forms a resin layer of a photographic support and by surface condition of titanium dioxide (hereafter merely referred to as "$TiO_2$") contained in the polyolefin resin composition.

As $TiO_2$ to be contained in a resin layer for a photographic support, $TiO_2$ to which surface treatment is subjected has heretofore been employed. Examples of $TiO_2$ which has undergone such surface treatment include $TiO_2$ obtained by depositing hydrous aluminum oxide or hydrous aluminum oxide and hydrous silicon dioxide on the surface of $TiO_2$ particles to modify $TiO_2$, etc., as described in Japanese patent application KOKAI No. 35625/77 (The term "KOKAI" refers to an unexamined application which has been laid open to public inspection).

Reasons why $TiO_2$ to which surface treatment has been made to such a high extent is employed in the photographic art are because, in the case of using $TiO_2$ which has undergone no surface treatment or surface treatment to a very mild extent;

(1) the $TiO_2$ adversely affects photographic emulsion,
(2) dispersibility of $TiO_2$ becomes poor,
(3) adhesion between a resin layer and an emulsion layer becomes poor,
(4) white background of a photograph is liable to undergo change with the passage of time,
(5) whitening effect with a fluorescent whitening agent is poor, as are also described in Japanese patent application KOKAI No. 35625/77. And hardly is such $TiO_2$ used in a resin layer of a photographic support requiring particularly severe quality that has undergone no surface treatment or surface treatment to a very mild extent.

As $TiO_2$ is subjected to surface treatment to such a high extent for satisfying the requirements in the art, however, deterioration in quality of a polyolefin resin-coated paper due to die lip stains becomes serious. In the case where no $TiO_2$ is incorporated into a resin layer of a photographic support, of course, sharpness is seriously deteriorated and the support is useless as a photographic support. It has further been found that when the content of $TiO_2$ in a resin layer is low, chances of generating die lip stains are small but shielding power is small and it cannot be used as a photographic support; on the other hand, when the content of $TiO_2$ is high, shielding power is sufficient but die lip stains occur markedly.

As a result of extensive investigations, the present inventors have found that die lip stains are markedly reduced by choosing an olefin resin composition having physical property value n as defined hereinafter of not greater than 5 at 200° C. and at a shearing rate of 1000/sec.

The term "physical property value n" referred to in the present invention will be described below.

Figure 2:
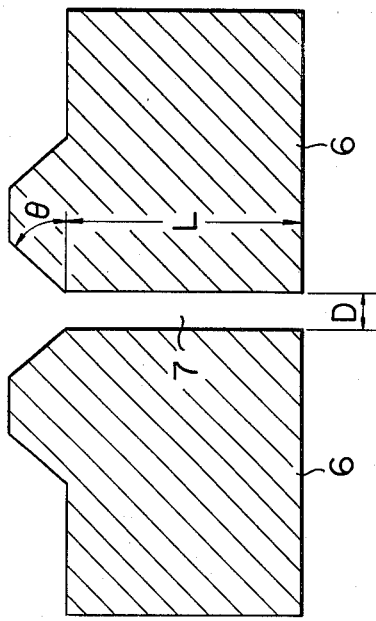
FIG. 2 is a cross sectional view of the capillary section.
Figure 1:
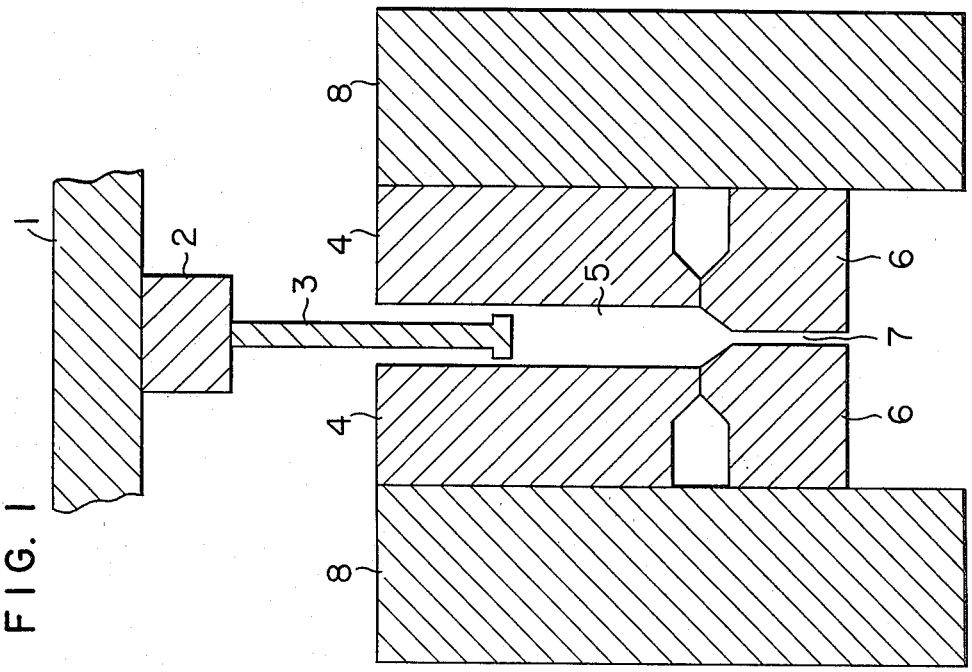
FIG. 1 is a cross sectional view of an outlined capillary rheometer.

Firstly, an outline of a capillary rheometer used for measurement is shown in FIGS. 1 and 2. In these figures, numeral 1 represents a movable beam, numeral 2 is a load cell, numeral 3 is a plunger, numeral 4 is a cylinder block, numeral 5 is a cylinder, numeral 6 is a capillary block, numeral 7 is a capillary and numeral 8 is a thermostat.

A diameter of cylinder 5 shown in FIG. 1 is 10 mm. Diameter D of capillary 7 shown in FIGS. 1 and 2 is 1.5 mm. As capillary 7, three kinds having length L of 10 mm, 20 mm and 30 mm, respectively, are employed. Angle $\theta$ shown in FIG. 2 is 45°.

Measurement is performed as follows. Thermostat 8 shown in FIG. 1 is kept at a fixed temperature to maintain the temperature of the measurement system constant. Then, an olefin resin composition is fed into cylinder 5. When movable beam 1 moves down at a fixted rate, pressure is applied to the olefin resin composition via plunger 3 of load cell 2 and the olefin resin composition is passed through capillary 7 and extruded out. In this case, the total of shearing stress generated at the wall of a capillary tube and admission resistance accompanied by admission of the olefin resin composition from the cylinder into the capillary is detected as stress by load cell 2.

Figure 3:
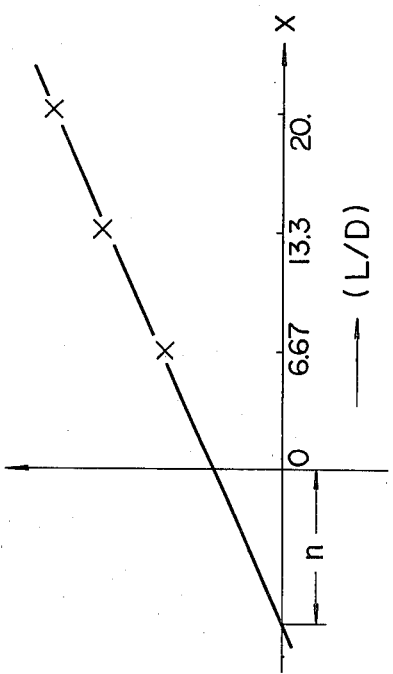
FIG. 3 represents a graph plotting data obtained by measurement.

When data measured using three kinds of capillaries having different lengths are plotted to the L/D values, a graph as shown in FIG. 3 is obtained. Physical property value n is defined by an intersecting point of a straight line connecting these three measurement points and the X-axis. The stress value expressed by the intersecting point of the straight line and the Y-axis represents admission resistance. Physical property value n is an absolute value which represents contribution of admission resistance to the total resistance as a value expressed by the L/D scale and varies depending upon kind of resin.

The present inventors have found that when an olefin resin composition having physical property value n at 200° C. and at shearing rate of 1000/sec. of 5 or greater is extruded from a slit die, die lip stains are seriously caused and that an olefin resin composition having physical property value n at 200° C. and at shearing rate of 1000/sec. of not greater than 5 provides minimized die lip stains.

According to the present invention, occurrence of die lip stains are surprisingly reduced by selecting olefin resin so as to have physical property value n at 200° C. and at shearing rate of 1000/sec. of not greater than 5, preferably not greater than 4.

Accordingly, by the practice of the present invention, loss due to generation of die lip stains can be markedly reduced upon coating of a melted resin and various properties which are desired as a photographic support can be imparted.

As polyolefins which can be employed in the present invention, there are low density polyethylene, high density polyethylene and polypropylene having various densities and melt indices (hereafter referred to as "MI"); these are employed singly or in combination.

In the practice of the present invention, any of rutile type and anatase type can be used as $TiO_2$ to be incorporated into the olefin resin compositon. $TiO_2$ can also be modified by depositing hydrous aluminum oxide and/or hydrous silicon dioxide onto the particle surface thereof. It is preferred that $TiO_2$ having 0.35 wt% or less in weight loss on drying obtained by wet classification and then drying without performing any surface treatment be employed. More preferably, $TiO_2$ having 0.35 wt% or less in weight loss on drying—which is obtained by subjecting the aforesaid $TiO_2$ undergoing no treatment with any inorganic substance to treatment with an organic substance such as surface treatment with silanol, surface treatment with metal salts of fatty acids, e.g., zinc stearate, calcium stearate, etc. and then drying the same—is employed.

Even in the case of $TiO_2$ which undergoes surface treatment with hydrous aluminum oxide or hydrous silicon dioxide, good results can similarly be obtained if $TiO_2$ is forcedly dehydrated and dried at high temperatures, e.g., above 350° C., to 0.35 wt% or less in weight loss on drying. Thus, the weight loss occurs by heating.

Further in the case that the content of $TiO_2$ in polyolefin resin composition is below 5 wt% based on the polyolefin resin composition, shielding power is insufficient as a photographic support; on the other hand, with the content exceeding 40 wt%, fluidizability or the like is reduced and such is not preferred. A particularly preferred content of $TiO_2$ is in a range of from 9 wt% to 20 wt%.

In the practice of the present invention, metal salts of aliphatic acids can also be incorporated into the olefin resin composition.

Specific examples of aliphatic acid metal salts which can be employed in accordance with the present invention include zinc stearate, calcium stearate, aluminum stearate, magnesium stearate, zirconyl octylate, sodium palmitate, calcium palmitate, sodium laurate, etc.

The polyolefin resin composition in accordance with the present invention may also contain, in addition to $TiO_2$ and metal salts of aliphatic acids, white pigments such as zinc oxide, talc, calcium carbonate, etc.; aliphatic acid amides such as stearic acid amide, arachidonic acid amide, etc.; antioxidants such as tetrakis[methylene-3-(3,5-di-tert-butyl-4-hydroxyphenyl)-propionate]methane, 2,6-ditert-butyl-4-methylphanol, etc.; color pigments such as ultramarine, Indian red, etc.; fluorescent whitening agents, and the like.

The polyolefin resin-coated paper of the present invention can be prepared by melt-extruding and coating a polyolefin resin composition onto a running paper sheet or a running synthetic paper base (hereafter merely referred to as "base paper") through a slit die into a film shape. In this case, it is preferred that a temperature for melt extrusion be in a range of from 200° C. to 350° C. As slit dies, flat dies such as a T-shaped die, an L-shaped die, a fish tail type die, etc. are preferred and a diameter of the slit opening is desirably of from 0.1 to 1 mm. It is also preferred that prior to coating the resin composition onto base paper, base paper be subjected to activation treatment such as a corona discharge treatment, a flame treatment, etc. A thickness of the resin layer of the resin-coated paper is not particularly limited but the resin layer obtained by extrusion-coating in a thickness of from about 5 to about 50 microns is generally advantageous. Further in ordinary polyolefin resin-coated paper, both surfaces of which base paper are coated with resin, the resin surface (surface on which emulsion is coated) containing $TiO_2$ possesses a glossy surface, a mat surface, a silky surface, etc. depending upon utility and the back surface is generally a non-glossy surface; the surface thereof or, if necessary both the surface and the back surface can be subjected to activation treatments such as a corona discharge treatment, a flame treatment, etc.

Base paper which can be employed for the practice of the present invention can be any of ordinary paper made of natural pulp, paper made of synthetic fibers and so called synthetic paper obtained by paper-making of synthetic resin film, but paper made of natural pulp mainly composed of wood pulp such as needle leaf pulp, broadleaf pulp or a pulp mixture of needle leaf pulp and broadleaf pulp is advantageously employed. A thickness of base paper is not particularly limited but it is preferred that base paper having smooth surface be employed. Basis weight is preferably of from 50 g/m² to 250 g/m².

Base paper mainly composed of natural pulp which is advantageously employed for the practice of the present invention may contain various high molecular weight substances and additives. For example, cationized starch, cationized polyacrylamide, anionized polyacrylamide, carboxy-modified polyvinyl alcohol, gelatin, etc. can be incorporated as paper intensifiers for dry paper; aliphatic acid salts, rosin derivatives, dialkylketone dimer emulsions, petroleum resin emulsions, ammonium salts of styrene-maleic anhydride copolymer alkyl esters, etc. as sizing agents; clay, kaolin, calcium carbonate, barium sulfate, $TiO_2$, etc. as pigments; melamine resins, urea resins, epoxylated polyamide resins, etc. as paper intensifiers for wet paper; polyvalent metal salts such as aluminum sulfate, aluminum chloride, etc., cationic polymers such as cationized starch, etc. as fixing agents; sodium hydroxide, sodium carbonate, hydrochloric acid, etc. as pH controlling agents; table salt, a Glauber's salt, etc. as inorganic electrolytes. In addition, dyes, fluorescent whitening agents, latices, and the like can also be incorporated in suitable combination.

Various silver halide photographic emulsion layers such as emulsion layers of silver chloride, silver bromide, silver chlorobromide, silver iodobromide or silver chloroiodobromide can be provided onto the photographic support in accordance with the present invention. Further, color couplers can also be incorporated into the silver halide photographic emulsion layers to form a multi-layer silver halide photographic element. As binders for these silver halide emulsion layers, in addition to ordinary gelatin, hydrophilic high molecular weight substances such as polyvinyl pyrrolidone, polyvinyl alcohol, sulfuric acid esters of polysaccharides, etc. can be employed. Further, the aforesaid silver halide emulsion layers can also contain various additives. For example, cyanine dyes, merocyanine dyes, etc. can be incorporated as sensitizing dyes; water soluble gold compounds, culfur compounds, etc. as chemical sensitizers; hydroxy-triazolopyrimidine compounds, mercapto-heterocyclic compounds, etc. as antifoggants or stabilizers; formalin, vinylsulfone compounds, aziridine compounds, etc. as hardening agents; benzene sulfonates, sulfosuccinic acid ester salts, etc. as coating aids; dialkylhydroquinone compounds as stain-preventing agents; benzotriazole compounds as UV absorbing agents; fluorescent whitening agents; dyes for improving sharpness; antistatic agents, pH controlling agents; water soluble iridium, rhodium compounds upon formation and dispersion of silver halide, etc.; these additives can also be incorporated in appropriate combination.

The present invention will now be explained in more detail with reference to the examples below.

EXAMPLE 1

A mixture of 70 parts by weight of low density polyethylene (MI=9, density 0.920), 30 parts by weight of alumina-treated anatase type $TiO_2$ and 1.5 part by weight of zinc stearate was thoroughly kneaded at about 150° C. using a Banbury mixer to prepare a $TiO_2$ master batch. Then, 30 parts by weight of the $TiO_2$-containing master batch, 40 parts by weight of low density polyethylene (MI=9, density 0.920) and 30 parts by weight of high density polyethylene (MI=7, 0.962) both as diluting agents were mixed in a dry state. The mixture was melt-extruded onto a photographic base paper having basis weight of 160 g/m² in combinations as shown in Table 1 as a coating rate of 100 m/min and a melt temperature of 320° C. in a coated amount of 30 mg/m², using a melt extruder (which was made Sample A).

Samples B, C and D were prepared in combinations as shown in Table 1 in the same manner as in Sample A.

Results obtained are shown in Table 1.

The melt extruder used for the present invention was equipped with a screw extruder having an extrusion opening of 65 mm and a T-shaped die having a width of 750 mm. Further, a cast cooling roll having a flat smooth surface previously subjected to hard chromium plating was employed.

TABLE 1

| Sample | Master Batch Resin MI | Master Batch Resin Density | Anatase Type $TiO_2$ | Part by Weight | Diluting Resin MI | Diluting Resin Density | Part by Weight | MI | Density | Part by Weight | (1) Physical Property Value n | (2) Number of Die Lip Stains | State of Coated Film |
|---|---|---|---|---|---|---|---|---|---|---|---|---|---|
| A | 9 | 0.920 | Alumina surface treatment | 30 | 9 | 0.920 | 40 | 7 | 0.962 | 30 | 4.60 | 9 | considerably good |
| B | 9 | 0.944 | Alumina surface treatment | 30 | 9 | 0.920 | 40 | 9 | 0.944 | 30 | 3.16 | 4 | good |
| C (outside the Invention) | 4 | 0.923 | Alumina surface treatment | 30 | 5 | 0.920 | 40 | 5 | 0.963 | 30 | 5.45 | >100 | poor |
| D (outside the Inven- | 8 | 0.918 | Alumina surface treatment | 30 | 8 | 0.918 | 40 | 9 | 0.950 | 30 | 5.10 | 35 | poor |

TABLE 1-continued

| | Master Batch | | | | Diluting Resin | | | | | (1) Physical Property Value n | (2) Number of Die Lip Stains | State of Coated Film |
|---|---|---|---|---|---|---|---|---|---|---|---|---|
| Sample | MI | Resin Density | Anatase Type TiO₂ | Part by Weight | MI | Density | Part by Weight | MI | Density | Part by Weight | | | |
| tion) | | | | | | | | | | | | | |

(1): Data obtained by measurement at a melt temperature of 200° C. and a shearing rate of 1000/sec using a capillary rheometer.
(2): Number of die lip stains after 1 hr. from the initation of melt extrusion.

From these results shown in Table 1, it is understood that Samples A and B comprising the polyolefin resin composition of the present invention provided minimized die lip stains and good states of the resulting coated film, and especially Sample B is excellent; whereas with Samples C and D which were outside the present invention, number of die lip stains was generated and the state of the resulting coated film was not good.

What is claimed is:

1. In a process for preparing a polyolefin resin-coated paper for photographic use which comprises melt-extruding and coating a polyolefin resin composition containing titanium dioxide onto at least one surface of a paper sheet or a synthetic paper base,
   the improvement comprises using as said polyolefin resin composition a composition having a physical property value n of not greater than 5 at 200° C. and a shearing rate of 1000/sec., where n is as shown in FIG. 3 of the drawings and is defined by an intersecting point of a straight line connecting the three measurement points and the X-axis, the three measurement points being obtained by employing three capillaries having different lengths L and different diameters D and plotting the L/D values, n being an absolute value which represents the contribution of admission resistance to the total resistance.

2. The process as claimed in claim 1 wherein said polyolefin resin is a polyethylene resin.

3. The process as claimed in claim 1 wherein said polyolefin resin contains at least one kind of high density polyethylene resin.

4. The process as claimed in claim 1 wherein the physical property value n is not greater than 4.

5. The process as claimed in claim 1 wherein the content of titanium dioxide is from 5 to 40 wt% based on the polyolefin resin composition.

6. The process as claimed in claim 5 wherein the content of titanium dioxide is from 9 to 20 wt% based on the polyolefin resin composition.

7. The process as claimed in claim 1 wherein as the titanium dioxide is used titanium dioxide which was subjected to wet classification and then drying without performing any surface treatment.

8. The process as claimed in claim 1 wherein as the titanium dioxide is used titanium dioxide having 0.35 wt% or less in weight loss on heating.

9. The process as claimed in claim 7 wherein the titanium dioxide has 0.35 wt% or less in weight loss on heating.

10. The process as claimed in claim 8 wherein as the titanium dioxide is used titanium dioxide modified by depositing hydrous aluminum oxide and/or hydrous silicone dioxide on the surface thereof.

11. The process as claimed in claim 10 wherein titanium dioxide is subjected to wet classification.

12. The process as claimed in claim 8 wherein as the titanium dioxide is used titanium dioxide which was subjected to wet classification and then treatment with an organic substance.

13. The process as claimed in claim 12, wherein the treatment with an organic substance is surface teatment with silanol or surface treatment with metal salts of fatty acids.

14. A polyolefin resin-coated paper for photographic use obtained by carrying out the process defined in claim 1.

* * * * *